Patented Dec. 12, 1939

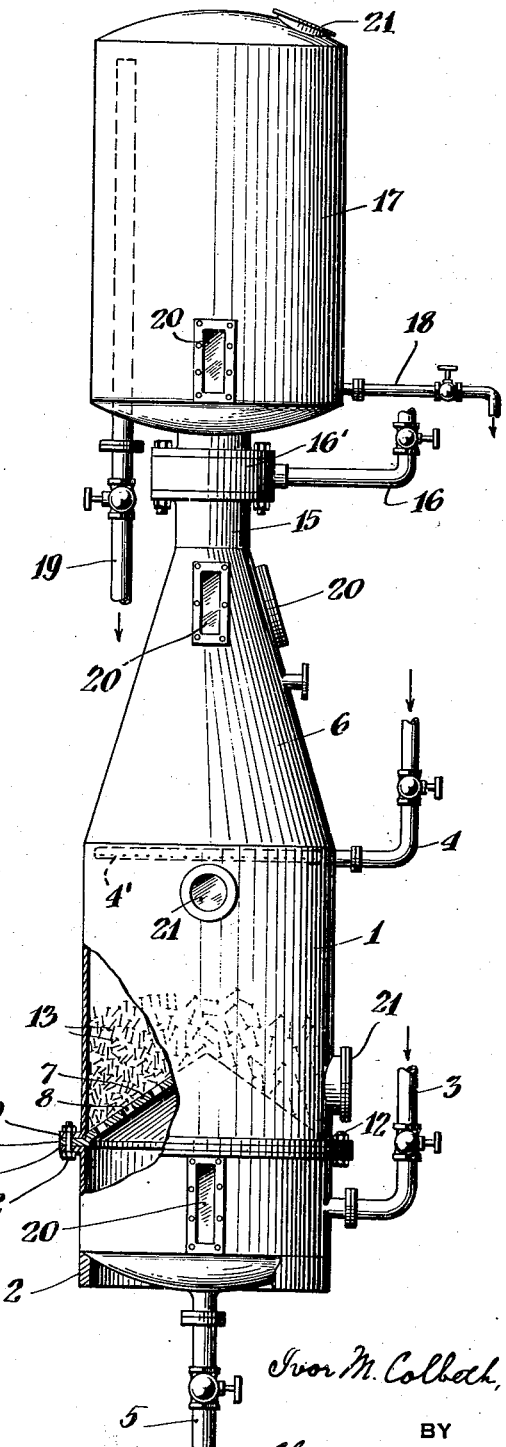

2,183,486

UNITED STATES PATENT OFFICE 2,183,486

PROCESS OF TREATING LIQUIDS

Ivor M. Colbeth, East Orange, N. J., assignor to Baker Castor Oil Company, New York, N. Y., a corporation of Delaware Application September 13, 1937, Serial No. 163,576

26 Claims. (Cl. 260—425)

This invention relates to a process for treating liquids, one of which has a specific gravity different from another one. This is a continuation-in-part of my application Serial No. 94,135, filed August 4, 1936.

The invention is particularly applicable to the treatment of liquids that are immiscible with each other and contain constituents which will chemically react with each other. The liquids may contain other solids in solution which discolor the same or are impurities therein. By this invention the process is made continuous and is applicable to a large variety of situations, such as continuous esterification, continuous saponification, continuous extraction of liquid, and others.

Although the invention is applicable to a large number of different sorts of liquids, it is particularly suitable for purifying animal, fish and vegetable oils. It will be specifically described in connection with the purification of vegetable oils, and more specifically with the removal of fatty acids from them by saponifying them.

In practicing this invention with oil in which impurities or fatty acids are to be removed, an aqueous solution of caustic alkali is caused to move downwardly slowly while the oil is permitted to rise upwardly through it. Provision is made for dividing an incoming stream of the oil into a large number of droplets of suitable size without agitating the mixture sufficiently to cause an emulsion of oil and water to be formed even in the presence of any soap that may be formed in the process. This may be done by interposing a large number of mechanical obstructions or particles of solid matter, that are not reacted upon chemically, in the path of the rising oil, so that as the oil passes upwardly it will pass through interstices and along the surfaces of these obstructions so that it becomes retarded in its upward travel and is divided into many small droplets.

The oil is washed immediately after it has passed through the alkali solution by permitting it to pass upwardly through wash water which may move downwardly and dilute the alkaline solution which is used for treating the oil. Provision is made so that the speed of the downward movement of the wash water is greater than that of the alkaline water in which the oil is treated. It has been found desirable to use enough wash water to dilute the alkaline water sufficiently and still have enough excess wash water flow upwardly with the washed oil into a space where a comparatively quiescent layer or column of oil collects above the excess water, while any drops of water carried into this layer of oil settle out and are withdrawn below the oil layer with the excess wash water. The oil layer free from water is drawn off from the top.

A convenient arrangement of apparatus for carrying out the invention is indicated in the accompanying drawing, which is a side view partly in section.

In the drawing, reference character 1 indicates a chamber or container that may be mounted in any way, as for example upon a support 2, to keep it upright. A valved inlet 3 is connected to the lower portion of the chamber 1 and a valved inlet 4 is connected to a perforated ring 4' in the upper portion of the container 1. A valved outlet 5 is connected to the lower end of the chamber 1 and an extension 6 in the form of a truncated cone is provided at the upper end of this chamber.

A cone 7 or the like having perforations or holes 8 through it is located in the chamber 1 a short distance above the inlet 3. It may be provided with a flange 9 that can be clamped between flanges 10 and 11 on sections of the chamber 1 to keep this cone in place when the bolts 12 are tightened. Packing of nails 13 or other objects, that will cause the liquid that enters through the inlet 3 to be retarded and divided into small drops as it passes upwardly through the mass of nails or other objects, is located in the chamber 1 above the cone 7.

A neck 15 or portion of considerably smaller cross section than the chamber 1 is provided at the upper end of the extension 6. A valved inlet pipe 16 for wash water enters the neck 15 tangentially through the portion 16' between its ends, and a settling or draw-off tank 17 is connected to the upper end of the neck 15. A valved outlet pipe 18 for excess water leads from the lower portion of the tank 17 and a valved outlet pipe 19 for the washed oil enters the lower portion of the tank 17 with its open upper end terminating a short distance below the upper end of this tank.

Sight glasses 20 for observation and hand holes 21 for cleaning or other purposes are provided at convenient places.

The operation of the process is as follows when the invention is used specifically for removing fatty acids from castor oil.

It has been found that soaps of the fatty acids in castor oil are soluble in the oil when it is hot and when the oil is cold it is too viscous to allow the soap to settle, and that when attempts are made to remove the soap by means of water, hydrolysis takes place, setting free the sodium hydroxide and fatty acids which are dissolved by the water and oil respectively.

In carrying out the present invention with castor oil, the oil is introduced into the lower portion of the chamber 1 through the inlet 3 and an aqueous solution of sodium hydroxide or other alkali is introduced through the inlet 4 and perforated ring 4' so that it is distributed over the entire area of the container 1. The oil, being lighter than the solution, rises, while the solution descends. The incoming oil is divided into small droplets by the cone 7 and nails 13, so that the oil and solution are caused to come into intimate contact. Soap is formed by reaction of the alkali of the solution with the fatty acids of the oil. The soap that is formed is quickly dissolved in the water and carried downwardly with any unreacted alkali that may remain and out through the outlet pipe 5. The oil from which the fatty acids have been removed passes upwardly through the neck 15 into the lower portion of the tank 17.

The wash water that enters through the pipe 16 and portion 16' causes a whirling or stirring or agitation and effectively washes the rising oil and causes many of the droplets to contact and coalesce into drops of larger size which rise into the tank 17 to form a layer. The valves in the inlet water pipe 16 and outlet water pipe 18 are so regulated that enough water enters to wash the oil, part of this water passing downwardly and diluting the alkali solution entering through the pipe 4 to the proper strength, another part of this water passing upwardly and forming a layer or column of water in the bottom of tank 17 into which the drops of water that may have been carried with the washed oil into the upper layer of oil in this tank 17 settle and are drawn off through the outlet pipe 19.

The valves in the pipes 3, 4, 5, 16 and 18 are regulated in accordance with the liquids used, so that the time of contact and sort of treatment will be that which is desired, as can be ascertained by inspection through the sight glasses 20 or by examination of the liquids from the outlet pipes.

While the process is in regular operation the speed of the downward movement of the wash water is a maximum at the neck 15 and is at an approximately minimum constant speed in the lower part of the extension 6 and until it reaches the nails 13, when the speed is increased while passing the nails and finally slows up beyond the nails. The speed of the oil is at a minimum through the nails as it apparently passes through the interstices and crawls along the surfaces of the nails. After it leaves the nails, it rises freely at a speed of about 10 feet a minute. This speed is decreased farther up, due to the downward speed of the water in the neck 15. After the oil passes through this neck it rises freely at about 10 feet a minute until it coalesces to form a column in the upper portion of the apparatus. The concentration of the caustic soda is at a maximum at its point of entrance through the pipe 4 and decreases due to dilution with water and reaction with fatty acid as it progresses downward through the column. In contrast to this, the concentration of soap is at a maximum at the point of entrance of the oil through the pipe 3 located at or near the bottom of the chamber 1, and decreases as it proceeds up the column to zero or practically zero near the point where the caustic soda enters the chamber 1. The fatty acid in the oil decreases as the oil moves upwardly, being highest at the point of entrance and zero or practically zero at or near the point where the caustic enters.

The washing at the neck 15 is needed due to the fact that caustic alkali may be absorbed by the oil and carried upwardly, and it is desirable to free the oil from the caustic before allowing it to coalesce. This washing also helps to insure the complete removal of the soap from the oil. With the arrangement of apparatus described, all of the water used in washing does not necessarily pass downwards through the column but only such an amount as is needed to dilute the caustic used in the neutralization of the oil. The rest is discharged through the outlet 18 at such a rate as to maintain a suitable depth of oil in the portion 17 above the water therein to give time enough for drops of water to settle through the oil before it passes out through the outlet 19.

Many variations of the process as carried out in the apparatus may be made. For example, the chamber 1 may be made longer and a smaller amount of packing 13 used; the volume of oil that can be treated varies as the square of the diameter of the column; the speed at which the oil rises can be decreased by increasing the downward speed of the water and also by increasing the amount or decreasing the size of the packing particles 13; the amount of fatty acids left in the oil can be decreased by increasing the concentration of the caustic and also by increasing the depth and fineness of the packing; and by keeping the temperature elevated, as by heating one or more of the incoming liquids and heat-insulating the apparatus, the viscosities are decreased and the rate at which the oil can be treated is increased. The liquids may be fed to the apparatus by gravity or by pumps.

The following is given as a specific example to illustrate how the process has been carried out in the sort of apparatus shown in the drawing. #3 castor oil, which is commercial castor oil that had been solvent-extracted, containing about 4% of free fatty acids, was treated in a column in which the entrance point of the oil pipe 3 was 5 feet below the entrance point of the caustic soda pipe 4, and the entrance of the wash water pipe 16 was 5 feet above the entrance point of this pipe 4. The depth of nails 13 through which the oil had to rise was 3½ feet. The downward speed of the sodium hydroxide solution in the chamber 1 was maintained at 10 linear feet per hour, while the upward speed of the oil was about 10 feet a minute. The downward speed of the water in the extension 6 was about 10 feet an hour. The concentration of caustic soda in the water at about the level of the point of entrance of the caustic soda was maintained between 0.5% and 0.75%. The concentration of the caustic soda entering the column through pipe 4 was 50%. The amount of soap in the water leaving the column through the pipe 5 was about 3½% of the water. The temperature of the wash water entering through pipe 16 was maintained at 180° F., the temperature of the oil entering through the pipe 3 was kept at 150° F., and the temperature of the soap solution leaving through pipe 5 was 168° F. The acidity of the oil leaving through the pipe 18 was .56% and its temperature was 168° F. The nails 13 occupied between 50% and 75% of the volume of the space in which they were located. The capacity of the column was 40 gallons of oil per hour per square foot of cross section of column. The term "stable emulsion" is intended to mean an emulsion that will not break by being warmed.

What is claimed is:

1. The process of treating two immiscible liquids of different specific gravities with each other one of which liquids contains material that will chemically react with material contained in the other one to form a compound that is soluble in one of said liquids, which comprises passing the heavier one downwardly through a confined space at a speed slower than the rate of rise of the lighter one through it, introducing the lighter one into the lower part of the confined space, and dividing it into droplets in the presence of the other one and while avoiding agitation that would cause the liquids to form a stable emulsion while said other one dissolves and carries away said compound.

2. The process of treating two immiscible liquids of different specific gravities with each other one of which liquids contains material that will chemically react with material contained in the other one to form a compound that is soluble in one of said liquids, which comprises passing the heavier one downwardly through a confined space at a speed slower than the rate of rise of the lighter one through it, introducing the lighter one into the lower part of the confined space, and dividing it into droplets by permitting it to float upwardly through openings while said other one dissolves and carries away said compound and while avoiding agitation that would cause the liquids to form a stable emulsion.

3. The process of treating two immiscible liquids of different specific gravities with each other one of which liquids contains material that will chemically react with material contained in the other one to form a compound that is soluble in one of said liquids, which comprises passing the heavier one downwardly through a confined space at a speed slower than the rate of rise of the lighter one through it, introducing the lighter one into the lower part of the confined space, and dividing it into droplets by permitting it to float upwardly through openings in a pile of contacting hard objects while said other one dissolves and carries away said compound and while avoiding agitation that would cause the liquids to form a stable emulsion.

4. The process of treating two immiscible liquids of different specific gravities with each other one of which liquids contains material that will chemically react with material contained in the other one to form a compound that is soluble in one of said liquids, which comprises passing the heavier one downwardly through a confined space at a speed slower than the rate of rise of the lighter one through it, introducing the lighter one into the lower part of the confined space, and dividing it into droplets by permitting it to float upwardly through a pile of nails while said other one dissolves and carries away said compound and while avoiding agitation that would cause the liquids to form a stable emulsion.

5. The process of purifying an oil containing fatty acids, which comprises passing an aqueous alkaline solution downwardly through a confined space at a rate slower than drops of the oil will rise through it, introducing the oil into the lower portion of said space and dividing it into droplets without agitating it or causing it to form a stable emulsion while dissolving the resulting soap in the liquid phase of said solution and removing it.

6. The process of purifying an oil containing fatty acids, which comprises passing an aqueous alkaline solution downwardly through a confined space at a rate slower than drops of the oil will rise through it, introducing the oil into the lower portion of said space, and dividing it into droplets by permitting it to pass through openings in the path of the descending solution while dissolving the resulting soap in the liquid phase of said solution and removing it and also while avoiding agitation that would cause the liquids to form a stable emulsion.

7. The process of purifying an oil containing fatty acids, which comprises passing an aqueous alkaline solution downwardly through a confined space at a rate slower than drops of the oil will rise through it, introducing the oil into the lower portion of said space, and dividing it into droplets by permitting it to pass through openings located across the lower portion of said space, while dissolving the resulting soap in the liquid phase of said solution and removing it and also while avoiding agitation that would cause the liquids to form a stable emulsion.

8. The process of removing fatty acids from castor oil, which comprises passing an aqueous alkaline solution slowly downwardly through a confined space while causing the oil to float in drops upwardly through it until substantially all of the fatty acids therein are saponified and while dissolving the soap thus formed in the material and removing it from below the reaction zone and also while avoiding agitation that would cause the liquids to form a stable emulsion.

9. The process of removing fatty acids from castor oil, which comprises passing an aqueous alkaline solutions slowly downwardly through a confined space while causing the oil to float in drops upwardly through it until substantially all of the fatty acids therein are saponified and a major portion of the soap that is formed is dissolved in the solution and while dissolving the soap thus formed in the material and removing it from below the reaction zone and also while avoiding agitation that would cause the liquids to form a stable emulsion.

10. The process of removing fatty acids from castor oil, which comprises passing an alkaline solution slowly downwardly through a confined space while causing the oil to float in drops upwardly through it until substantially all of the fatty acids therein are saponified, washing the oil, and utilizing the wash water for regulating the concentration of said alkaline solution.

11. The process of removing fatty acids from castor oil, which comprises passing an alkaline solution slowly downwardly through a confined space while causing the oil to float in drops upwardly through it until substantially all of the fatty acids therein are saponified, washing the oil by introducing wash water into said confined space above the place where said alkaline solution is introduced, and separating the washed oil and wash water by gravity.

12. The process of removing fatty acids from castor oil, which comprises passing an alkaline solution slowly downwardly through a confined space while causing the oil to float in drops upwardly through it until substantially all of the fatty acids therein are saponified, washing the oil by introducing wash water into said confined space above the place where said alkaline solution is introduced, separating the washed oil and wash water by gravity into layers, and withdrawing oil from the top of its layer and wash water from below the top of its layer.

13. The process of removing fatty acids from castor oil, which comprises passing an alkaline solution slowly downwardly through a confined space while causing the oil to float in drops upwardly through it until substantially all of the fatty acids therein are saponified, washing the oil, separating the washed oil and wash water by gravity into layers, withdrawing oil from the top of its layer, and regulating the depth of the washed oil layer by means of said wash water.

14. The process of removing fatty acids from castor oil, which comprises passing a stream of an aqueous alkaline solution of about 0.5% to about 0.75% concentration downwardly at about 10 feet per hour while causing droplets of the castor oil to float upwardly through a sufficient length of said stream to cause substantially all of the fatty acid in said oil to be saponified in one passage.

15. The process of removing fatty acids from castor oil, which comprises passing an alkaline solution slowly downwardly through a confined space while causing the oil to float in drops upwardly through it until substantially all of the fatty acids therein are saponified, and washing the oil by introducing wash water into said confined space above the place where said alkaline solution is introduced and causing said wash water to mingle with said solution.

16. The process of removing fatty acids from castor oil, which comprises passing an alkaline solution slowly downwardly through a confined space while causing the oil to float in drops upwardly through it until substantially all of the fatty acids therein are saponified, and washing the oil by introducing wash water into said confined space above the place where said alkaline solution is introduced and causing a portion of said wash water to descend and join said solution and another portion is caused to rise and carry off said drops.

17. The process of removing fatty acids from castor oil, which comprises passing an aqueous alkaline solution slowly downwardly through a confined space while causing the oil to float in drops upwardly through it until substantially all of the fatty acids therein are saponified, and introducing wash water into said confined space above the saponifying zone.

18. The process of removing fatty acids from castor oil, which comprises passing an aqueous alkaline solution slowly downwardly through a confined space while causing the oil to float in drops upwardly through it until substantially all of the fatty acids therein are saponified, introducing wash water into said confined space above the saponifying zone, and causing its velocity of descent to slow down before it reaches the saponifying zone.

19. The process of removing fatty acids from castor oil, which comprises passing an aqueous alkaline solution slowly downwardly through a confined space while causing the oil to float in drops upwardly through it until substantially all of the fatty acids therein are saponified, introducing wash water into said confined space above the saponifying zone, and injecting water laterally into the upper portion of said space with sufficient velocity to cause agitation of said drops.

20. The process of removing fatty acids from an oil containing fatty acids, which comprises passing an alkaline solution slowly downwardly through a confined space while causing the oil to float in drops upwardly through it until substantially all of the fatty acids therein are saponified while avoiding agitation that would cause the liquids to form a stable emulsion, and washing the oil by introducing wash water into said confined space above the place where said alkaline solution is introduced and causing said wash water to mingle with said solution.

21. The process of removing fatty acids from vegetable oil, which comprises passing an alkaline solution slowly downwardly through a confined space while causing the oil to float in drops upwardly through it until substantially all of the fatty acids therein are saponified while avoiding agitation that would cause the liquids to form a stable emulsion, and washing the oil by introducing wash water into said confined space above the place where said alkaline solution is introduced and causing said wash water to mingle with said solution.

22. The process of removing fatty acids from animal oil, which comprises passing an alkaline solution slowly downwardly through a confined space while causing the oil to float in drops upwardly through it until substantially all of the fatty acids therein are saponified while avoiding agitation that would cause the liquids to form a stable emulsion, and washing the oil by introducing wash water into said confined space above the place where said alkaline solution is introduced and causing said wash water to mingle with said solution.

23. The process of removing fatty acids from fish oil, which comprises passing an alkaline solution slowly downwardly through a confined space while causing the oil to float in drops upwardly through it until substantially all of the fatty acids therein are saponified while avoiding agitation that would cause the liquids to form a stable emulsion, and washing the oil by introducing wash water into said confined space above the place where said alkaline solution is introduced and causing said wash water to mingle with said solution.

24. The process of removing fatty acids from linseed oil, which comprises passing an alkaline solution slowly downwardly through a confined space while causing the oil to float in drops upwardly through it until substantially all of the fatty acids therein are saponified while avoiding agitation that would cause the liquids to form a stable emulsion, and washing the oil by introducing wash water into said confined space above the place where said alkaline solution is introduced and causing said wash water to mingle with said solution.

25. The process of purifying an oil containing fatty acids, which comprises passing an aqueous alkaline solution downwardly through a confined space at a rate slower than drops of the oil will rise through it, introducing the oil into the lower portion of said space and dividing it into droplets at points spaced laterally from the downwardly moving solution while avoiding agitation that would cause the liquids to form a stable emulsion.

26. The process of purifying an oil containing fatty acids, which comprises passing an aqueous alkaline solution downwardly through a confined space at a rate slower than drops of the oil will rise through it, introducing the oil into the lower portion of said space and dividing it into droplets at points surrounded by the downwardly moving solution while avoiding agitation that would cause the liquids to form a stable emulsion.

IVOR M. COLBETH.